Figure 1:
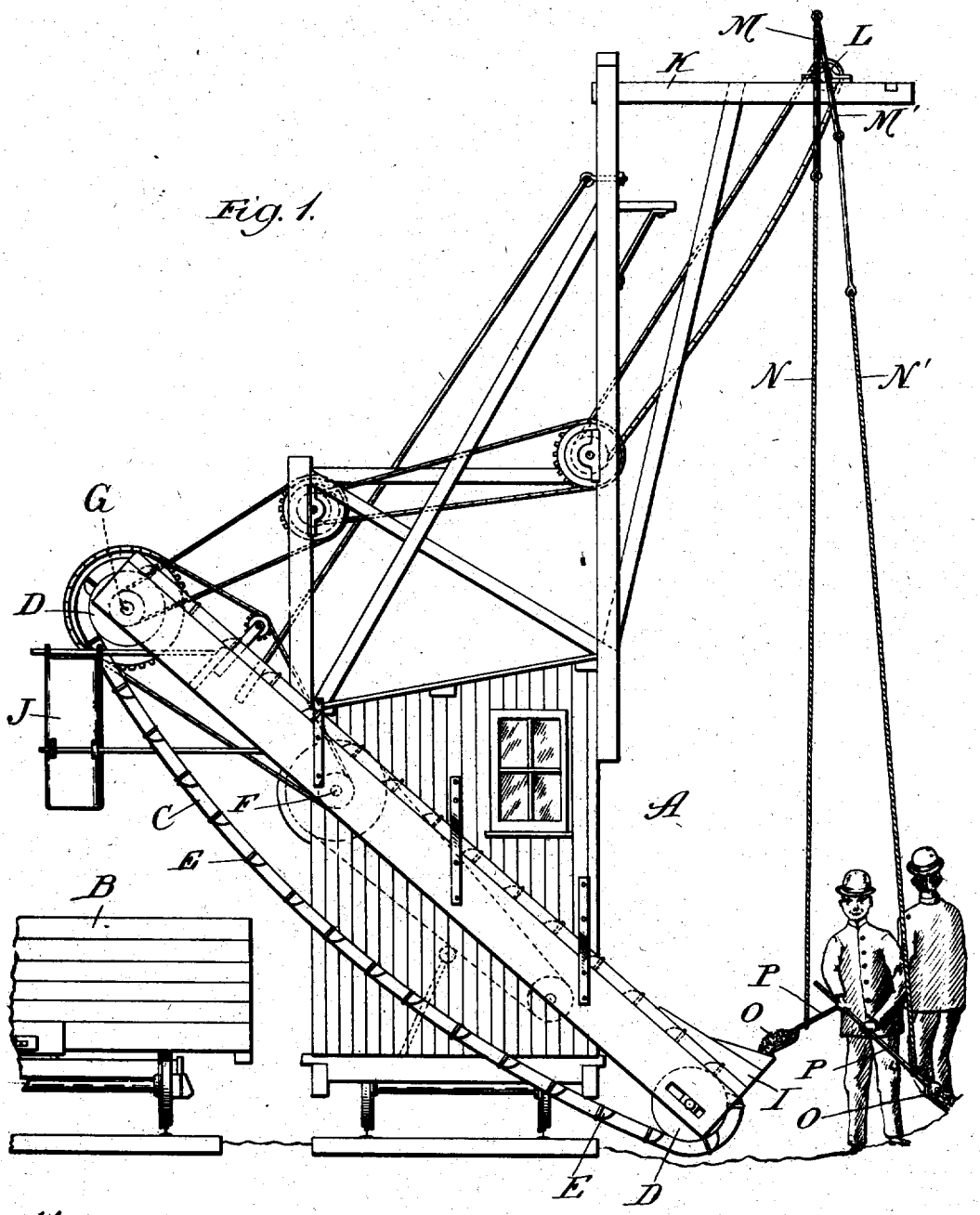

No. 12,087. REISSUED FEB. 24, 1903.

A. TORREY, DEC'D.

C. F. TORREY, ADMINISTRATRIX.

MACHINE FOR EXCAVATING, CONVEYING, AND LOADING BALLAST.

APPLICATION FILED MAR. 19, 1902. 2 SHEETS—SHEET 1.

Witnesses:
Paul Carpenter
H. W. Smalley

Inventor:
Augustus Torrey
By Paul Synnestvedt
Atty.

THE NORRIS PETERS CO., PHOTO-LITHO., WASHINGTON, D. C.

No. 12,087. REISSUED FEB. 24, 1903.

A. TORREY, DEC'D.

O. F. TORREY, ADMINISTRATRIX.

MACHINE FOR EXCAVATING, CONVEYING, AND LOADING BALLAST.

APPLICATION FILED MAR. 19, 1902.

2 SHEETS—SHEET 2.

Witnesses:
Paul Carpenter
H. W. Smalley

Inventor:
Augustus Torrey
By Paul Synnestvedt
Att'y

THE NORRIS PETERS CO., PHOTO-LITHO., WASHINGTON, D. C.

UNITED STATES PATENT OFFICE.

AUGUSTUS TORREY, OF DETROIT, MICHIGAN; CHARLOTTE F. TORREY ADMINISTRATRIX OF SAID AUGUSTUS TORREY, DECEASED.

MACHINE FOR EXCAVATING, CONVEYING, AND LOADING BALLAST.

SPECIFICATION forming part of Reissued Letters Patent No. 12,087, dated February 24, 1903.

Original No. 659,008, dated October 2, 1900. Application for reissue filed March 19, 1902. Serial No. 99,031.

*To all whom it may concern:*

Be it known that I, AUGUSTUS TORREY, a citizen of the United States of America, residing at Detroit, in the county of Wayne and State of Michigan, have invented certain new and useful Improvements in Machines for Excavating, Conveying, and Loading Ballast upon Railway-Cars, of which the following, taken in connection with the accompanying drawings, is a specification.

On an extensive road-bed gravel is constantly required for ballast-renewals and other work incident to the proper maintenance of the road-bed, yet the amount is seldom large enough to permit the economical employment of the steam-shovel, as the latter requires the attendance of a locomotive and of an extra engine and crew to haul the ballast away and distribute it along the track. On the other hand, when hand-labor is employed the cost of loading is considerable, although the heavy expense of a locomotive and extra engine and crew may be done away with, as the local freight-trains are sufficient to haul the loaded cars away. An arrangement which permits the loading of smaller quantities of material than would be handled by a steam-shovel working to its capacity and at a cost for loading which approximates that of the steam-shovel work would therefore be a very desirable improvement; and it is the object of my invention to accomplish the same.

To this end my improvement has for its principal feature a novel means for loading the ballast at the pit, which embodies a combination of machine-work and hand-labor.

Briefly described, it consists of a loading-car which occupies a track at the foot of the gravel-bank and has inclined conveyers moving transversely of the car, which receives the material from hoppers at the foot of the conveyers on the side toward the bank and dumps it into the ballast-car standing upon an adjacent track. The material is dug and deposited into the hoppers by the men with scoop-shovels similar to the ordinary shovel, but of larger size. Each man handles his shovel much as in the usual manner, but has the assistance of power derived from the prime motor, which imparts a constant rising-and-falling motion to each shovel through a suspension-rope of some length freely supporting the shovel from an overhead frame on the car. In working with this type of shovel each man times his movements with the up-and-down motion of the shovel. When the shovel is in about its lowest position, the operator presses it into the bank and continues this pressure during the early part of the upward movement imparted by the power. At about the time of the highest position of the shovel the operator swings it over the hopper and overturns it. He returns the shovel-blade to the bank during the downward movement. Thus the filling of the shovel is largely and the lifting of the loaded shovel is completely done by power, and the manual participation in the work accomplished is required at a time when the vertical movement due to the power is least. The ballast-car standing beside the loading-car on a separate track is filled for half its length without shifting either car by first permitting the gravel to drop directly from the conveyers into the gravel-car, and when sufficient material is deposited opposite the conveyers inclined troughs are used to direct the material from both conveyers into the intervening space. In this manner the object of the invention is fully accomplished, and I will now proceed to describe more fully the various details of an apparatus designed for carrying out the invention and shown in the accompanying drawings, in which—

Figure 2:
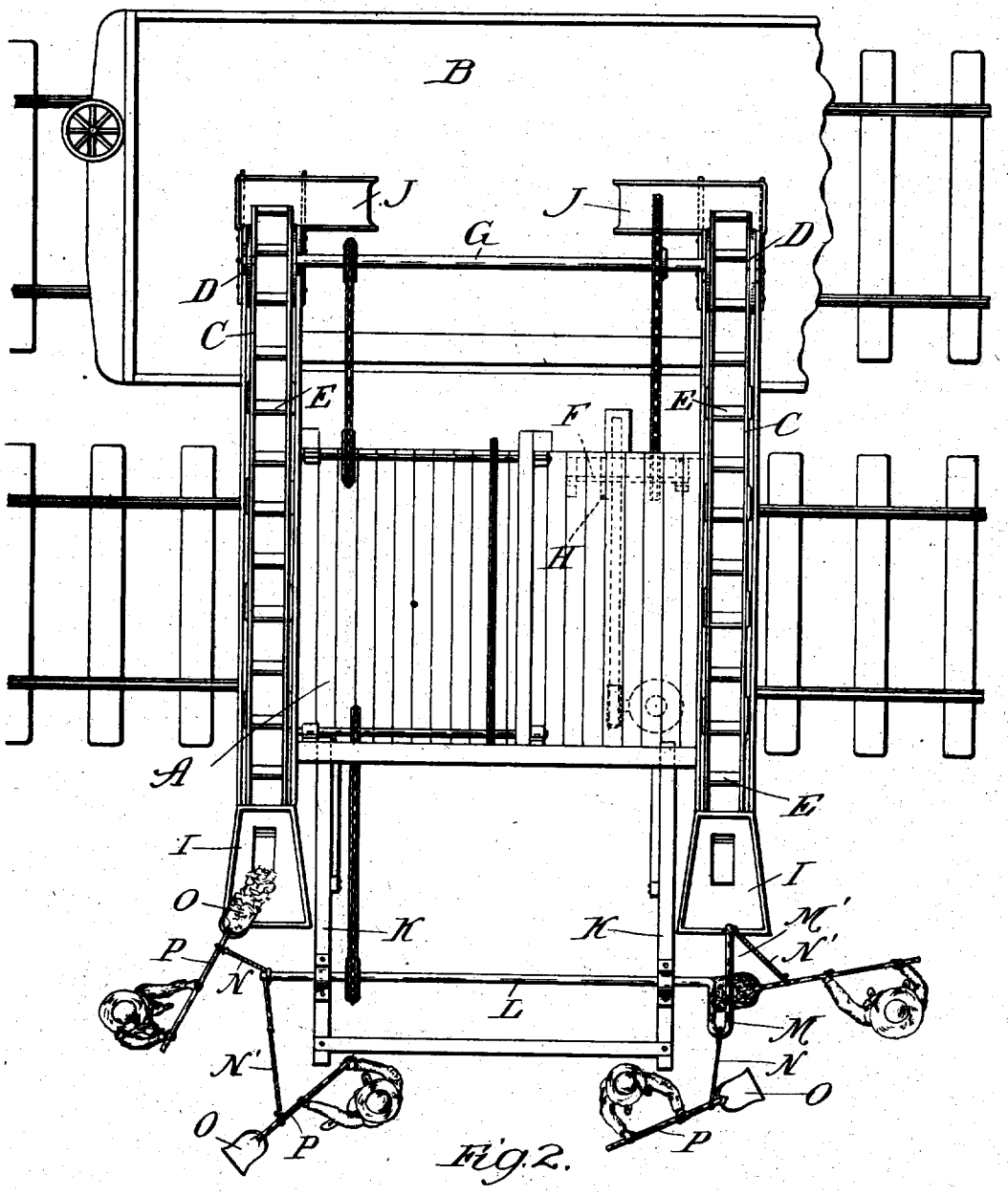

Figure 1 is an end elevation showing both the loading and the ballast cars as in practical operation, and Fig. 2 is a plan of Fig. 1.

A denotes the loading-car, and B the ballast-car, both standing on separate tracks side by side, the former being at the foot of the gravel-bank. The loading-car is housed over to inclose the source of power (not shown) and furnish a suitable support at the ends for two conveyer-belts C, arranged transversely of the car at an incline and passing over pulleys D. This belt carries buckets E, formed of steel plates with overlapping sides, as in the usual manner of forming a continuous carrier. Power is conveyed from the engine to the counter-shaft F and thence to the shaft G, and a suitable clutch H is arranged on the counter-shaft F, by means of which the conveyers may be thrown out of gear and stopped without shutting down the engine, as is desirable in shifting cars. This clutch may be worked by cords pulled from a convenient point outside the loading-car.

At the foot of each conveyer and extending toward the gravel-bank is a hopper I for supplying the material to the conveyer, and to the upper end of the conveyer-frames are pivotally secured the troughs J, adapted to be adjusted in position beneath the discharge ends of the conveyers to receive the material and direct it toward the central portions of the ballast-car after the end portions are filled.

Attached to the upper part of the elevator-car there is an overhanging frame K, carrying a horizontal shaft L at some distance above the track and beyond a perpendicular line through either hopper. On each end of this shaft there is a double crank, each forming a pair of oppositely-extending crank-arms M M′. From these cranks are suspended two ropes N N′, to each of which is attached at the lower end a scoop-shovel O, provided with a long handle P, the scoop being of a size to hold about two to three times more than the ordinary track-shovel. The rope is attached to the handle of the scoop somewhere near the blade and is provided with convenient means, such as a strap and buckle, to adjust the length of the rope. Each crank is of about a length equal to a little more than one-half the distance between the top of the hopper and the bottom of the tie of the loading-track, and the cranks at one end of the shaft are placed at right angles to the cranks at the other end. A rotary motion suitable to the comfort of the operator (say ten to twelve revolutions per minute) is transmitted to the shaft L from the prime motor through suitable intermediate connections.

In practice the parts being constructed and arranged as shown and described they are intended to operate as follows: Each single shovel has imparted to it by the revolution of the crank to which it is connected a rising-and-falling motion, in which it is alternately lowered down to the bottom of the ties and raised up to a height above the hopper, so that in keeping time the operator in thrusting his shovel into the gravel-bank utilizes the upward motion to fill it and have it lifted up over the hopper, when he empties it by giving a turn to the handle. As the crank descends the scoop is lowered, while the operator at the same time turns the blade toward the gravel-bank for the next shovelful. In this manner each of the four scoops are worked from the one shaft, and owing to the relative dispositions of the cranks on the shaft the four shovels follow each other at intervals of one-quarter of a revolution, while the two shovels which deliver it into the same hopper are half a revolution apart. In this manner the work on the engine is evenly distributed, while at the same time the two men delivering to the same hopper do not interfere with each other in their work.

With a crank-shaft about twenty-four feet above the track, overhanging the inner rail about seven feet, and having cranks about one and one-half feet long it will be seen that the men can cut away the bank on a level with the under side of the ties at a distance of ten feet from the hopper with the full assistance of the power, while in unloading they will have to be swung less than four feet from the perpendicular line, which requires but little exertion. As the men can easily keep time with the shaft revolving about ten times a minute, each man will deposit ten large shovelfuls into the hopper, while the ordinary rate at which a shoveler will load gravel onto a flat car from the ground-level is only about eleven shovelfuls of the ordinary track-shovel per minute. Four shovelers, with the assistance of two men to pole down the bank, can thus load twelve cars holding twenty-six yards of gravel each per day of ten hours, and the hauling of this amount of gravel can be ordinarily accomplished by making use of the local freight-trains.

The loading-car may be provided with traction-wheels by suitable connection with the engine, although ordinarily this will not be necessary, as the shoveling crew can do the shifting themselves as the bank within their reach becomes shoveled away.

The troughs at the ends of the conveyers are made to slide in and out of position, and the gravel is first permitted to drop directly from the conveyers into the ballast-car until points opposite the conveyers are filled. Then the troughs are set in position (see Fig. 1) to direct the material from both conveyers into the intervening space, thus loading the car for one-half its whole length without the necessity of shifting either car.

Having thus described my invention, what I claim as new, and desire to secure by Letters Patent, is—

1. In a machine for the purpose described, a loading-car upon a track alongside of the bank and provided with inclined conveyers mounted on the car transversely of the track, and projecting with their ends beyond the sides of the car, the lower ends extending down to near the ground at the foot of the bank and provided with hoppers adapted to receive the material for supplying the conveyers by means of shovels and the upper ends extending to a suitable height and distance beyond the opposite side of the car for directly discharging the material from the conveyers upon a ballast-car standing alongside the loading-car on a separate track.

2. In a machine for the purpose described, a loading-car upon a track alongside of the bank and provided with two inclined conveyers mounted transversely of the track at the opposite ends of said car respectively, and projecting with their ends beyond the sides of the car, the lower ends of said conveyers extending from the car toward the foot of the bank, and provided with hoppers adapted to supply the material to the conveyers and to receive it by means of manually-operated shovels from the bank and the upper ends of said conveyers extending on the opposite sides to a distance and height for directly discharging the material from both conveyers into the opposite ends respectively, of a ballast-car upon a separate track alongside of the loading-car.

3. In a machine for the purpose described, a loading-car upon a track alongside of the bank and provided with two inclined conveyers transversely supported at the opposite ends on the car respectively, each conveyer projecting with its lower end beyond the side of the car toward the foot of the bank and with its upper end beyond the opposite side of the car, said conveyers provided at their lower ends with hoppers and at their upper ends provided with lateral discharge-chutes adapted to be thrown into and out of operation, all so arranged that a ballast-car standing on a separate track beside the loading-car may be filled by first conveying the material directly from the hoppers and then completing the load by directing the material from both conveyers toward the intervening spaces by means of the chutes.

4. In a machine for the purpose described, a loading-car upon a track alongside of the bank and having its platform inclosed with a housing, two inclined conveyers transversely supported on the outside of the housing at the opposite ends thereof respectively, a source of power inclosed within said housing and suitable transmitting-gear for imparting a continuous motion to both of said conveyers under control of a suitable clutch for throwing them in and out of operation, said conveyers extending with their lower ends beyond the side of the car, toward the foot of the bank and provided with hoppers adapted to receive the material from the bank by means of shovels and to supply the same to the conveyers, and the upper ends extending beyond the opposite side of the car and adapted to directly discharge the material into a ballast-car standing on a separate track on the side of the loading-car.

5. In a machine for the purpose described, the combination of a loading-car upon a track alongside of the bank and provided with two inclined conveyers mounted thereon transversely to the track and adapted to receive the material from hoppers at the foot of the conveyers on the side of the loading-car adjacent to the bank and discharge it on the opposite side into a ballast-car standing alongside of it on a separate track, shovels suspended from the loading-car free to swing between the hoppers and the bank and means for imparting a continuous rising-and-falling motion to the shovels as a mechanical aid to the manual operation of the same.

6. In a machine for the purpose described, the combination with a loading-car upon a track alongside the bank, and provided with inclined conveyers mounted on said car transversely of the track and adapted to receive the material from hoppers at the foot of the conveyers on one side of the car and convey it into a ballast-car upon the opposite side of said loading-car, of track-shovels pendulously suspended from the loading-car in front of the hoppers and mechanically-operating devices on said car from which said shovels are suspended and adapted to impart to said shovels a concerted up-and-down motion as a mechanical aid to the manual operation of said shovels.

7. In a machine for the purpose described, the combination of a loading-car upon a track alongside of the bank and provided with two inclined conveyers mounted thereon transversely to the track and adapted to receive the material from hoppers at the foot of the conveyers on the side of the loading-car adjacent to the bank and discharge it on the opposite side into a ballast-car standing alongside of it on a separate track, a revolving crank-shaft mounted on an overhanging frame above the hoppers and shovels, two for each hopper freely suspended from oppositely-extending cranks on said shaft and adapted to swing freely between the hoppers and the bank.

8. In a machine for the purpose described, the combination of a loading-car upon a track alongside of the bank and provided with two inclined conveyers mounted thereon transversely to the track and adapted to receive the material from hoppers at the foot of the conveyers on the side of the loading-car adjacent to the bank and discharge it on the opposite side into a ballast-car standing alongside of it on a separate track, a revolving crank-shaft mounted on an overhanging frame above the hoppers, and shovels, two for each hopper freely suspended in front of the hoppers by ropes from oppositely-extending cranks on said crank-shaft, the cranks supporting the shovels for one hopper being at right angles to the cranks supporting the shovels for the other hopper.

9. In a machine for the purpose described, the combination with a loading-car upon a track alongside of the bank and provided with two inclined conveyers operated from a source of power on the car and adapted to receive the material from the hoppers on the side of the car adjacent to the bank near the ground and convey it directly into a ballast-car standing on the other side of the loading-car, of the crank-shaft having oppositely-extending cranks at each end, with the cranks at one end placed at right angles to the cranks at the other end the overhead frame supporting said shaft on the loading-car at a distance above the hoppers and overhanging the same, the length of the cranks, the actuating connection with the source of power for imparting continuous rotary motion to the crank-shaft, the suspension devices from said crank-shaft and the track-shovels, connected at their handles to the suspension devices and adapted to be manually operated with the mechanical assistance of the power derived from the motion of the crank-shaft.

10. A loading apparatus comprising in combination, a scoop-shovel, a suspension-rope, supporting said shovel, and power-driven means automatically imparting a continuous reciprocating motion to said shovel through said suspension-rope.

11. A loading apparatus comprising in combination, a set of scoop-shovels, suspension-ropes supporting said shovels, and power-driven means automatically imparting a constant rising-and-falling motion to said shovels in alternation through said suspension-ropes.

12. A loading apparatus comprising in combination, a scoop-shovel, a suspension-rope supporting said shovel, and power mechanism constructed to automatically impart a constant rising-and-falling motion to said shovel through said suspension-rope, an overhead frame carrying said power mechanism, and a car carrying said frame.

13. A loading apparatus comprising in combination, a scoop-shovel, a suspension-rope supporting said shovel, and a power-driven rotary crank continuously reciprocating said shovel through said suspension-rope.

14. A loading apparatus comprising in combination, two scoop-shovels, a suspension-rope for each scoop-shovel, a frame, a rotating shaft carried by said frame, means for rotating said shaft, and oppositely-disposed cranks on said shaft, one for each suspension-rope.

15. The combination, in excavating apparatus, of a shovel having a handle, a movable suspending means for the shovel, and continuously-driven power mechanism for giving a continuous vertically-reciprocating movement to said shovel through said suspending means, substantially as described.

16. A loading apparatus comprising in combination, a scoop-shovel, a suspension-rope supporting said shovel, and continuously-rotated power mechanism constructed to impart a rising-and-falling motion to said shovel through said suspension-rope, and adjusting mechanism for varying the length of said suspension-rope.

17. A car provided with a power-driven conveyer and having a superstructure provided with power-driven means for constantly reciprocating a shovel suspended therefrom, whereby the manual operation of filling and dumping said shovel to supply the conveyer is assisted and regulated by the engine supplying power to the conveyer.

18. An excavating apparatus comprising a car provided with a power-driven conveyer, a superstructure thereon carrying power-driven means for continuously reciprocating a shovel suspended therefrom, to lift said shovel as it is filled and swung to empty on said conveyer.

19. An excavating apparatus comprising a car provided with a power-driven conveyer, a frame on said car having a set of power-driven cranks, a set of shovels suspended from said cranks in pairs balanced against each other, and constantly reciprocating to assist in the manual filling and lifting of said shovels in excavating.

In testimony whereof I have hereunto set my hand in the presence of two subscribing witnesses.

AUGUSTUS TORREY.

In presence of—
H. H. ADAMS,
D. S. SUTTRUL.